(12) United States Patent
Labib et al.

(10) Patent No.: US 6,478,951 B1
(45) Date of Patent: Nov. 12, 2002

(54) COMPATIBILIZER FOR CRUMB RUBBER MODIFIED ASPHALT

(75) Inventors: Mohamed E. Labib, Princeton, NJ (US); Brian H. Chollar, Falls Church; G. Mohammed Memon, Sterling, both of VA (US)

(73) Assignee: The United States of America as represented by the Secretary of Transportation, Washington, DC (US)

( * ) Notice: Subject to any disclaimer, the term of this patent is extended or adjusted under 35 U.S.C. 154(b) by 763 days.

(21) Appl. No.: 08/640,984

(22) Filed: Apr. 29, 1996

(51) Int. Cl.⁷ .............. C10C 1/00; C10C 3/00; C10G 73/06; C08L 95/00
(52) U.S. Cl. .............. 208/39; 208/22; 208/23; 208/34; 106/281.1; 106/273.1
(58) Field of Search .............. 208/22, 23, 39, 208/44; 106/281.1, 273.1

(56) References Cited

U.S. PATENT DOCUMENTS

| | | | |
|---|---|---|---|
| 3,844,668 A | * 10/1974 | Winters et al. | 404/72 |
| 3,919,148 A | * 11/1975 | Winters et al. | 260/28.5 |
| 4,560,414 A | * 12/1985 | Kikegawa et al. | 208/23 |
| 4,818,367 A | * 4/1989 | Winkler | 208/23 |
| 5,248,407 A | * 9/1993 | Bardot et al. | 208/22 |
| 5,334,641 A | * 8/1994 | Rouse | 524/71 |
| 5,468,539 A | * 11/1995 | Crivelli | 428/141 |
| 5,486,554 A | * 1/1996 | Truax | 524/71 |
| 5,501,130 A | * 3/1996 | Duong et al. | 106/281.1 |
| 5,506,283 A | * 4/1996 | McInnis et al. | 515/332.8 |
| 5,525,653 A | * 6/1996 | Rouse | 524/71 |
| 5,704,971 A | * 1/1998 | Memon | 106/281.1 |

* cited by examiner

Primary Examiner—Mark L. Bell
Assistant Examiner—Patricia L. Hailey
(74) Attorney, Agent, or Firm—Otto M. Wildensteiner

(57) ABSTRACT

A compatibilizer and process for use in making crumb rubber modified asphalt. The compatibilizer causes the crumb rubber to completely interact with the asphalt, thereby improving the rheological properties of the asphalt and reducing the tendency of pavement made with the asphalt to ravel. The compatibilizer has as its reactive component one or more glycidyl groups; its polymeric backbone can be ethylenic, styrenic, or acrylic or ethylene vinyl acetate (EVA).

11 Claims, 3 Drawing Sheets

| Asphalt | Oxygen | Nitrogen | -COOH | Asphaltenes | Polar Aromatics |
|---|---|---|---|---|---|
| AAG1 | 1.1% | 1.1% | <0.005% | 5.0% | 51.2% |
| AAD1 | 0.9% | 0.77% | 0.015% | 20.5% | 41.3% |
| AAM1 | 0.5% | 0.55% | 0.005% | 4.0% | 50.3% |

Figure 1

| Asphalt | Original High Temp. °C | Control High Temp. °C | Modified High Temp. °C | Original Low Temp. °C | Control Low Temp. °C | Modified Low Temp. °C |
|---|---|---|---|---|---|---|
| AAG1 | 62 | 66 | 72 | -19 | -24 | -29 |
| AAD1 | 63 | 80 | 80 | -31 | -28 | -35 |
| AAM1 | 66 | 68 | 73 | -23 | -30 | -32 |

Figure 2

| Asphalt | Original High Temp. °C | Control High Temp. °C | Modified High Temp. °C | Original Low Temp. °C | Control Low Temp. °C | Modified Low Temp. °C |
|---|---|---|---|---|---|---|
| AAM1 | 66 | 68 | 71 | -23 | -30 | -33 |

Figure 3

| Asphalt | Original High Temp. °C | Control High Temp. °C | Modified High Temp. °C | Original Low Temp. °C | Control Low Temp. °C | Modified Low Temp. °C |
|---|---|---|---|---|---|---|
| ABM | 61 | | 68 | -22 | | -30 |

Figure 4

Proposed reaction mechanism between the amine and epoxy group

Proposed reaction mechanism between the carboxylic and epoxy group

COMPATIBILIZER FOR CRUMB RUBBER MODIFIED ASPHALT

STATEMENT OF GOVERNMENT INTEREST

The present invention may be made or used by or on behalf of the Government of the United States without the payment of any royalties thereon or therefor.

BACKGROUND

The unique chemistry and internal molecular association of asphalt are responsible for its mechanical properties and hence for its use as a binder in asphalt concrete pavement. Large tonnages of asphalt are used every year in constructing roads throughout the world; thus any improvement in its properties, no matter how small, translates into considerable cost savings. The present invention is a means and method of improving the rheological properties of crumb rubber modified asphalt which is later used in pavement.

Adding crumb rubber to hot asphalt results in improved properties such as a wider useful temperature range. However, reports of performance of prior art crumb rubber modified asphalt concrete vary considerably; some pavements ravel after use, sometimes there is a decrease in the mechanical properties of the binder, and sometimes there are inconsistencies in the applicability of the asphalt concrete in the field. These variations result from differences in the types of asphalt; the source, composition, size, and process of making the crumb rubber particles; and in the process of incorporating the crumb rubber particles in the asphalt.

OBJECTS OF THE INVENTION

Accordingly, it is an object of the present invention to provide a means and method of improving the rheological properties of crumb rubber modified asphalt.

It is a further object of the present invention to provide such means and method which can be utilized with a broad range of asphalts.

It is a further object of the present invention to provide such means and method which are easy and economical to implement.

It is a further object of the present invention to provide such means and method which are not harmful to the environment.

It is a further object of the present invention to provide a means and method for improving the solubility and dispersion of crumb rubber in asphalt.

IN THE DRAWINGS

FIG. 1 shows the compositional ranges of the asphalts used in testing the present invention.

FIG. 2 shows the improvements realized by use of the present invention.

FIG. 3 shows the results of including a catalyst in the modification of one asphalt.

FIG. 4 shows the results of using methyl methacrylate glycidyl as a compatibilizer.

SUMMARY

Figure 5:
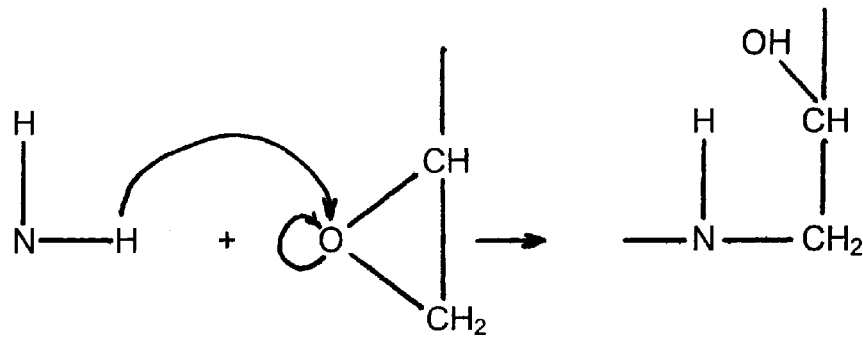
FIG. 5 shows the possible reaction mechanism which occurs in asphalt AAG1.

Briefly, the present invention comprises the use of a compatibilizer, containing reactive glycidyl epoxy functional groups, to improve the solubility and dispersion of crumb rubber in asphalt and to improve the rheological properties of the resulting mixture. Preferably the compatibilizer is first dissolved in a polar solvent such as tetrahydrofuran, then coated on the crumb rubber particles and the excess solvent is removed. The dried coated particles are then stirred to break up any lumps or clumps, and the coated crumb rubber is then stirred into hot liquid asphalt. The asphalt is then kept liquid for about 3 hours to assure complete solution of the crumb rubber in the asphalt, which then can be mixed with aggregate in the usual way to produce asphalt concrete.

DESCRIPTION OF THE PREFERRED EMBODIMENT

The present invention is concerned with the "wet" process of incorporating crumb rubber particles into asphalt—that is, adding the crumb rubber particles to the asphalt before mixing the asphalt with aggregate. It is directed to improving the properties of the asphalt and making them consistent across the various types of asphalts used in making asphalt concrete. The properties of interest are useful temperature range, compatibility of the crumb rubber with the asphalt, and incorporation of the crumb rubber in the asphalt.

The preferred compatibilizer for the present invention is a glycidyl-based compatibilizer made by the duPont Company and sold under the trade name "Elvaloy AM"; it is an ethylene based polymer made by copolymerizing ethylene vinyl acetate and glycidyl-containing monomers. The concentration of glycidyl groups is 0.5%. Although Elvaloy AM is the preferred compatibilizer, it is thought that other glycidyl systems based on other polymeric backbones or copolymers such as styrinic or acrylic based backbones, especially those based on methyl methacrylate, will also work.

The compatibilizer is first dissolved in a solvent such as tetrahydrofuran (four times as much tetrahydrofuran by weight as Elvaloy AM) heated to about 85–90 degrees C. with stirring until it forms a gel. The crumb rubber particles are then added to this gel and stirred until they are free flowing in the suspension and all particles are coated with the gel. After all particles are completely covered with gel, they are dried by any desired means to remove all excess solvent. The dried particles are then stirred to break up any lumps or clumps, resulting in a free-flowing mass of coated particles.

If the Elvaloy AM compatibilizer is dissolved in more than four times its weight of tetrahydrofuran the high temperature properties ok the modified asphalt are improved, but the low temperature properties are degraded. Less solvent than four times the weight of Elvaloy AM degrades both the high and low temperature properties. Thus a four to one weight ratio between tetrahydrofuran and Elvaloy AM is optimum, with a higher ratio being desirable if the asphalt is to be used in a primarily high temperature environment.

The dried particles are then added to asphalt at a temperature of about 143–183 degrees C. while stirring. The particles disperse readily into the asphalt, and it is left at that temperature with occasional stirring for about 3 hours. At this point the asphalt is a very smooth liquid, as opposed to the prior art crumb rubber modified asphalts which tend to have lumps of undissolved rubber in them. These lumps are thought to be the cause of some of the ravelling of the prior art crumb rubber modified asphalt concretes.

Alternatively, the compatibilizer alone could be first added to the liquid asphalt as is done in the prior art;

however, this requires that the asphalt be checked for complete dissolution and reaction of the compatibilizer. After this is done, the crumb rubber particles are added as above.

The preferred temperature for the average application is 163 degrees C. plus or minus 20 Centigrade degrees. A higher temperature produces more trimers, which improves the high temperature properties at the expense of the low temperature properties. Conversely, a lower temperature produces more dimers and monomers, which improves the low temperature properties at the expense of the high temperature properties. Obviously, if an asphalt is to be used in a primarily hot or primarily cold environment it would be desirable to adjust the reaction temperature accordingly to get the desired properties.

Research has shown that since there is a chemical reaction between the crumb rubber and the asphalt molecules, smaller crumb rubber particles are better than large particles. Therefore for these tests the smallest size particles available, mesh size −80, were used.

Three asphalts were used in developing the present invention; they were chosen to cover the range of asphalts used in pavements in the United States. These asphalts were the SHRP (Strategic Highway Research Program) grades AAG1, AAD1, and AAM1 having the compositional ranges shown in FIG. 1.

Since the glycidyl epoxy functional groups in the compatibilizer of the preferred embodiment react with the carboxylic acid and other groups of the asphalt and also with those present on the surface of the rubber particles, both acidic and basic, the level of those groups is important to the effectiveness of the present invention. Glycidyl is also known to react with the amines, amides, and possibly other nitrogen-containing groups in the asphalt as well as on the surface of the rubber particles. This reactivity with the functional groups in the asphalt and on the surface of the particles is what makes glycidyl such a reactive compatibilizer.

Two batches of each of the above three crumb rubber modified asphalts were made and tested; in each case one batch incorporated the compatibilizer of the present invention and one batch was made without the compatibilizer, as a control. The tests were conducted according to AASHTO test procedures TP5-93 and TP1-93. The results of the tests are shown in FIG. 2.

Asphalt grade AAG1 showed improvement over the original asphalt and the control asphalt in both the high and low temperature ranges. This allows a reduction in both hot weather rutting under heavy traffic and cold weather cracking, both of which are serious problems. This mixture contained 15% (by weight) crumb rubber; the optimum amount of compatibilizer was found to be 0.035 millimoles compatibilizer per gram of asphalt. Asphalt AAG1 is a lime treated asphalt, ABC1; i.e., it has no carboxylic acid groups in it. It does, however, have amine groups. Therefore, the possible reaction mechanixm will be for its reaction with amines. This possible mechanism between amines and epoxy groups is shown in FIG. 5.

Figure 6:
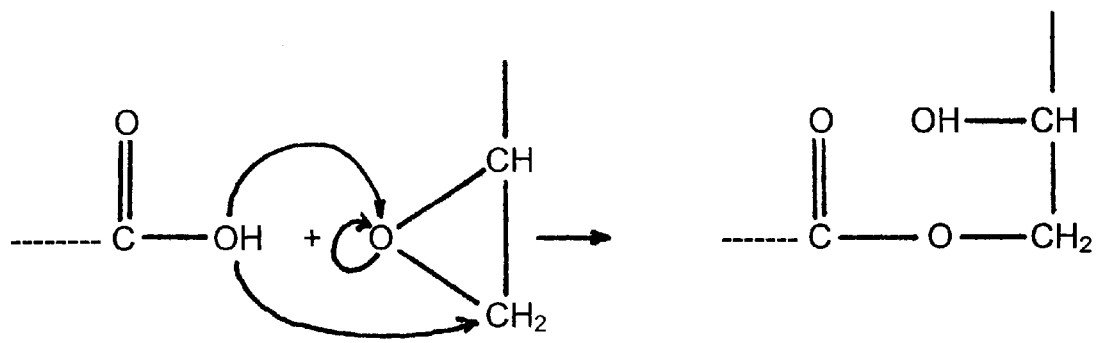
FIG. 6 shows the possible reaction mechanism in asphalt AAD-1 and perhaps asphalt AAM-1 as well.

Asphalt AAD-1 showed improvement in the low temperature range only; this is thought to be a result of the asphalt's overall chemical makeup and of the number of functional groups present in the asphalt. This mixture contained 15% crumb rubber and 0.025 millimoles compatibilizer per gram of asphalt. The possible interaction between the carboxylic acid groups of asphalt AAD-1 and the epoxy group is shown in FIG. 6. A similar interaction possibly also occurs in asphalt AAM-1.

Asphalt AAM-1 showed improvement in both high and low temperature ranges. This is thought to be a result of the solvent de-asphalting process used to manufacture this asphalt, and to the low concentration of carboxylic and other reactive groups in the asphalt. The mixture contained 0.04 millimoles compatibilizer per gram of asphalt and 15% crumb rubber.

In the proposed amine-epoxy group mechanism, the amine attacks the carbon atom adjacent to the oxygen in the epoxy group, breaking the epoxy C—O bond. The hydrogen atom then dissociates from the amine and attaches to the disassociated oxygen to form the hydroxy amine product. A similar mechanism occurs for the carboxylic acid group. The carboxylic acid oxygen attacks the carbon atom adjacent to the oxygen atom of the epoxy group with the same results. These mechanisms are shown in FIGS. 5 and 6 respectively.

In addition, para-toluene sulfonic acid was used as a catalyst in the asphalt-glycidyl reaction for one asphalt, AAM1. As shown in FIG. 3, the addition of the catalyst negated the beneficial effects of the compatibilizer on the high temperature properties, but increased its effects on the low temperature properties (i.e. it lowered the low temperature by 3 Centigrade degrees). The amount of catalyst was varied between 0.03 and 0.09 millimoles per gram of asphalt; the results shown are for a concentration of 0.07 millimoles, which was found to be optimum.

FIG. 4 shows the results of modifying asphalt ABM using glycidyl made with an acrylic polymer backbone. As can be seen, this produced an improvement in both high and low temperature ranges and demonstrates the ability of the present invention to utilize glycidyls having different backbones. This mixture contained 15% crumb rubber and 0.020 millimoles of compatibilizer per gram of asphalt.

At the present time crumb rubber is more expensive than asphalt; therefore the amount of crumb rubber used is a trade-off between cost and benefits obtained. At present cost levels, 15% is the maximum amount of crumb rubber that can be economically incorporated into the asphalt, although this may change with time.

In all cases, the asphalt which contained the compatibilizer was much smoother in consistency than the control which did not contain the compatibilizer.

While the present invention has been disclosed as using a compatibilizer that has been copolymerized with a polymer backbone to form a solid and then dissolving the copolymer to form a gel that is coated on the crumb rubber particles, it is obvious that other physical forms could be used. For example, a suitable powdered compatibilizer could be mixed with the crumb rubber particles and then the dry mixture could be added to the hot asphalt. Likewise, the crumb rubber particles could be mixed in a suitable liquid compatibilizer which could then be added to the liquid asphalt. In the same manner a copolymerizable compatibilizer other than Elvaloy AM could be used, or a compatibilizer which contains something other than reactive glycidyl epoxy functional groups could be used.

We claim:

1. An asphalt comprising: asphalt, crumb rubber, and a compatibilizer for said crumb rubber.

2. The asphalt of claim 1 wherein said compatibilizer comprises reactive glycidyl functional groups.

3. The asphalt of claim 2 wherein said reactive glycidyl functional groups are coated onto said crumb rubber particles prior to said crumb rubber being added to said asphalt.

4. The asphalt of claim 3 wherein said reactive glycidyl groups are copolymerized with a polymeric backbone prior to being coated onto said crumb rubber.

5. The asphalt of claim 4 wherein said backbone is an ethylenic backbone.

6. The asphalt of claim 5 wherein said backbone is ethylene vinyl acetate.

7. The asphalt of claim 4 wherein said backbone is a styrenic backbone.

8. The asphalt of claim 4 wherein said backbone is an acrylic backbone.

9. The asphalt of claim 8 wherein said backbone is methyl methacrylate.

10. The asphalt of claim 4 wherein said copolymer is dissolved in a solvent prior to being coated on said crumb rubber particles.

11. The asphalt of claim 10 wherein said solvent is tetrahydrofuran.

* * * * *